Patented Nov. 1, 1949

2,486,943

UNITED STATES PATENT OFFICE 2,486,943

POLYMERIZATION PROCESS IN AQUEOUS THIOCYANATE SOLUTIONS

Irving P. Hammer, Verona, and John B. Rust, East Hanover, N. J., assignors, by direct and mesne assignments, of one-half to Montclair Research Corporation, Montclair, N. J., a corporation of New Jersey, and one-half to Ellis-Foster Company, a corporation of New Jersey No Drawing. Application August 31, 1946, Serial No. 694,414

5 Claims. (Cl. 204—158)

This invention relates to a process for polymerizing unsaturated polymerizable compounds in the presence of a concentrated aqueous solution of calcium thiocyanate or other appropriate inorganic thiocyanates. An object is to provide an improved solvent in which polymerization occurs to advantage and from which the polymer can be readily obtained in useful form. Another object is to produce polymers having higher molecular weight than is found when polymerization occurs in an organic solvent. Still another object is to provide a polymerization process in which the solvent is readily recovered from the polymer and reclaimed.

It is known that sodium thiocyanate, potassium thiocyanate, zinc thiocyanates, etc., are such active polymerization inhibitors that in some instances they are especially useful in stabilizing substances such as acrylonitrile against polymerization. Small amounts of some of these materials, e. g., sodium thiocyanate and potassium thiocyanate, may be incorporated into potentially polymerizable materials in order to stabilize them over relativly long periods of time. These substances are particularly suitable in this respect since they may be easily separated from the polymerizable material merely by distillation, leaving the salt used as a residue. It is, therefore, entirely unexpected that polymerization occurs in a concentrated aqueous solution of calcium thiocyanate or other thiocyanate and leads to polymers of high molecular weight.

Thiocyanate solutions behave as hydrotropic solvents; that is, they produce decidedly greater solution of slightly soluble substances than does pure water at the same temperature. For the purpose of the present invention, these properties of thiocyanate solutions are shown when the ratio of anhydrous salt to water is greater than about 1:2.

Although not all polymerizable compounds are highly soluble in the concentrated aqueous solution, polymerization occurs when a mixture of a suitable polymerizable compound and thiocyanate solution is subjected to polymerization conditions. For example, some polymerizable compounds such as acrylonitrile and isopropenyl methyl ketone are soluble in a concentrated aqueous calcium thiocyanate solution, and polymerize therein to a solution of polymers. Others, such as methyl methacrylate and mixtures of this with acrylonitrile or isopropenyl methyl ketone are soluble but the polymers are insoluble and separate from the solution. Still others such as butyl methacrylate, ethyl methacrylate and ethyl acrylate are insoluble but polymerize in contact with or in suspension in the inorganic solution and the polymers are insoluble therein. Furthermore, vinyl acetate, which is soluble in concentrated thiocyanate solutions, and styrene, which is insoluble therein, show little tendency to polymerize in such solution. The general formula for unsaturated compounds which can be polymerized when in contact with concentrated aqueous solutions of thiocyanates in accordance with this invention is represented by

where R may be hydrogen or methyl and R' may be

Polymerization may be carried out by heating the mixture or by exposure to ultra-violet light or sunlight. The concentration of monomer is from 1 to 10% of the mixture and preferably from about 2 to 6%.

An advantage of the use of aqueous thiocyanate solutions is that the polymer can be separated without evaporation of the solvent. Polymers dissolved in a thiocyanate solution can be recovered by diluting the solution with water and filtering, or they can be deposited in or on the surface of an article by treating the article with the solution and then subjecting it to the action of water, or they can be obtained in shaped form as fibers or foils by passing the polymer solution as from a spinneret or slot through water, whereby coagulation occurs. Polymers insoluble in thiocyanate solutions are readily obtained by filtration and washing. The polymers are highly useful on account of their high molecular weight.

Polymerization may also be carried out in the presence of a plasticizer for the polymer. For example, a plasticizer is dissolved in the monomer and the solution subjected to polymerization after mixing with the hydrotropic thiocyanate solution.

The following are examples illustrative of this invention. All deal with calcium thiocyanate which is exemplary of inorganic thiocyanates soluble in water at room temperature, in a salt-to-water ratio of more than about 1:2 based on anhydrous salt, such as the thiocyanates of calcium, strontium, magnesium, potassium, sodium and ammonium.

Example 1

Twenty parts of methyl methacrylate were added to 380 parts of an aqueous solution of calcium thiocyanate (density=1.36 at 70° C. and containing 77–78% CaCNS·3H₂O or about 50% of the anhydrous salt) contained in a glass flask. The mixture was then illuminated by an ultra-violet lamp for a period of 18 hours at a temperature of from 20 to 25° C. The resulting mixture, which was in the form of rigid cake, was transferred to a large beaker with the aid of 1000 parts of cold water. The water addition caused the settling out of a granular white precipitate which, after approximately ½ hour, was filtered off and washed thoroughly with water. The precipitate was suspended in 1000 parts of water and subsequently filtered off and washed. The suspension and filtration procedure was repeated once more and the precipitate (polymer) washed thoroughly with water until no trace of the thiocyanate ion was detected in the filtrate. The polymer was then dried to a constant weight at 60° C. The method of polymerization described in this example resulted in a 97% yield of polymethyl methacrylate. A 0.75% solution of this polymer sample in methyl ethyl ketone had a viscosity of 92.47 millipoises at 20° C. when tested in a 2 ml. Ostwald pipette. When molded at a pressure of 3800 pounds per square inch at 170° C., a hard, tough disc was produced which was practically colorless.

*Example 2*

A mixture of 5 parts of isopropenyl methyl ketone and 95 parts of an aqueous solution of calcium thiocyanate (density=1.36 at 70° C.) was placed in a glass flask and illuminated by an ultra-violet lamp for a period of 18 hours at a temperature of from 20 to 25° C. The resulting fairly viscous solution was poured in a thin stream into 500 parts of water with constant stirring, as a result of which the polymer precipitated out in the form of threads. The precipitated polymer was filtered off after approximately ½ hour and washed thoroughly with water. The polymer was then subjected to the suspension and washing procedures as described in Example 1 and finally dried to constant weight at 60° C. This method of polymerizing isopropenyl methyl ketone resulted in a 79.4% yield of polymer. When the sample of polymer so produced was molded at a pressure of 4500 pounds per square inch at 100° C., a very pale green-colored disc was obtained which was somewhat brittle.

*Example 3*

Three parts of acrylonitrile were added to 97 parts of an aqueous solution of calcium thiocyanate (density=1.36 at 70° C.) and the mixture, contained in a glass bottle, illuminated by an ultra-violet lamp for a period of 20 hours at a temperature of from 20 to 25° C. A clear, very viscous solution resulted which was very fibrous and tacky. Water-coagulation of an extruded portion of the polymer solution resulted in fairly tough fibers. In addition, fairly tough films were produced by spreading the polymeric solution on a glass plate and coagulating the film in water.

*Example 4*

Exposure to sunlight for a period of 3 hours of a mixture of 2.5 parts of acrylonitrile, 0.25 part of tributylphosphate and 47.25 parts of an aqueous solution of calcium thiocyanate (density=1.36 at 70° C.) resulted in a viscous, opaque mixture with similar properties to the material described in Example 3.

*Example 5*

95 parts of an aqueous solution of calcium thiocyanate, having a density of 1.36 at 70° C., was added to a mixture of 2.72 parts of isopropenyl methyl ketone and 2.28 parts of methyl methacrylate (1:1 molar ratio) and the resulting solution illuminated by an ultra-violet lamp for a period of 18 hours at a temperature of from 20 to 25° C. The resulting rigid cake was broken up and coagulated with 200 parts of cold water. The precipitated copolymer was then filtered off after approximately ½ hour and worked up in the manner described in Example 1. An 88% yield of the copolymer was obtained which when molded at a pressure of 4500 pounds per square inch at 140° C. formed a pale tan disc, not quite as brittle as the product described in Example 2.

*Example 6*

10 parts of a mixture containing 8.01 parts of methyl methacrylate and 3.36 parts of isopropenyl methyl ketone (2:1 molar ratio) were added to 190 parts of an aqueous solution of calcium thiocyanate having a specific gravity of 1.36 at 70° C. and the solution irradiated by an ultra-violet lamp for a period of 19 hours at a temperature of from 20 to 25° C. 800 parts of water was used to coagulate the resulting rigid cake and the precipitated copolymer was worked up in the manner described in Example 1. The copolymer, obtained in 89% yield, was molded at 3800 pounds per square inch at 170° C. to form a practically colorless, tough disc.

*Example 7*

In a manner similar to that described in Example 6, 10 parts of a mixture of 8.01 parts of methyl methacrylate and 2.24 parts of isopropenyl methyl ketone (3:1 molar ratio) were polymerized. The copolymer so produced, in 92% yield, when molded under the same conditions as used in Example 6, yielded a practically colorless, tough disc.

It is relatively simple to reclaim and subsequently reuse the calcium thiocyanate or other thiocyanate solution. The procedure, in general, consists of (1) evaporating water from the diluted solvent remaining after filtering off the polymer until the specific gravity of the solution is just below the proper figure (2) filtering the concentrated solution and finally (3) concentrating the solution by additional evaporation until the desired specific gravity is obtained. In order to avoid decomposition of the thiocyanate, it is preferable to evaporate this solution under vacuum. In general, comparable yields of polymer are obtained through the use of either the original or reclaimed hydrotropic solvents as shown by the fact that when Example 1 was repeated using the reclaimed calcium thiocyanate solution, a yield of 97% of polymethylmethacrylate was obtained.

It has been found that good yields of polymer are obtained even though the ultra-violet exposure time is materially shorter than the 18 to 20 hours used in the above examples.

*Example 8*

2.5 parts of methyl methacrylate were added to 47.5 parts of an aqueous calcium thiocyanate solution having a specific gravity of 1.36 at 70° C. and the mixture illuminated by an ultra-violet lamp for a period of 7 hours. The resulting polymer mixture was worked up in a manner similar to that described in Example 1. A 99% yield of polymer was obtained, which, when molded under the same conditions as in Example 1, resulted in a hard, tough disc which was practically colorless.

*Example 9*

In a manner similar to that described in Example 8, using the same proportions of monomer and solvent, a sample of acrylonitrile was polymerized. A very viscous polymer solution resulted after 7 hours exposure to ultra-violet light. The polymer solution was very tacky and showed distinct fiber formation upon water-coagulation. The shortened period of exposure to ultra-violet light, however, resulted in a reduced yield of polyisopropenyl methyl ketone when the calcium thiocyanate solution was used as the solvent.

All of the above examples of polymerization deal with the situation wherein the monomer is soluble in the solvent. The resulting polymer, however, may be either soluble (such as polyacrylonitrile or polyisopropenyl methyl ketone in calcium thiocyanate solution) or insoluble (such as polymethyl methacrylate in calcium thiocyanate solution). Rapid polymerization may be effected upon exposure to ultra-violet light, however, even though the monomer used is insoluble in the hydrotropic solvent. For example, when a calcium thiocyanate mixture containing 5% of butyl methacrylate, ethyl methacrylate or ethyl acrylate (which are insoluble or only partially soluble in the mixture) was exposed to ultra-violet light at ordinary room temperature for 24 hours, evidence of polymerization was shown.

We claim:

1. The process of polymerizing a solution of an unsaturated compound selected from the group consisting of isopropenyl methyl ketone, methyl methacrylate and acrylonitrile, in an aqueous solution containing calcium thiocyanate in a salt-to-water ratio of more than 1:2.

2. The process of claim 1 wherein polymerization occurs under ultra-violet light.

3. The process of polymerizing isopropenyl methyl ketone in an aqueous solution containing calcium thiocyanate in a salt-to-water ratio of more than 1:2.

4. The process of polymerizing methyl methacrylate in an aqueous solution containing calcium thiocyanate in a salt-to-water ratio of more than 1:2.

5. The process of polymerizing acrylonitrile in an aqueous solution containing calcium thiocyanate in a salt-to-water ratio of more than 1:2.

IRVING P. HAMMER.
JOHN B. RUST.

REFERENCES CITED

The following references are of record in the file of this patent:

UNITED STATES PATENTS

| Number | Name | Date |
|---|---|---|
| 2,140,921 | Rein | Dec. 20, 1938 |
| 2,171,765 | Rohm | Sept. 5, 1939 |
| 2,356,767 | Kropa | Aug. 29, 1944 |

OTHER REFERENCES

Handbook of Chemistry & Physics 28th edition, 1944, pages 350 and 351.